Jan. 20, 1931. G. C. THOMAS, JR 1,789,915
CABLE CONNECTER
Filed Sept. 15, 1928
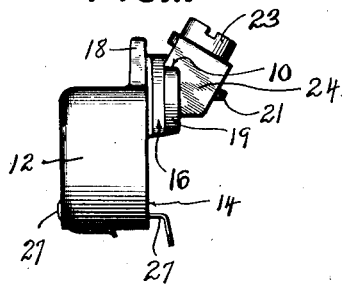
FIG.1.
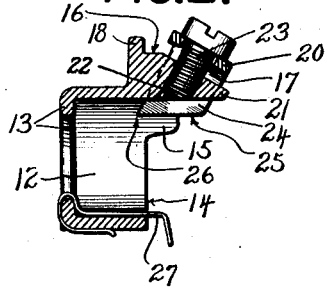
FIG.2.
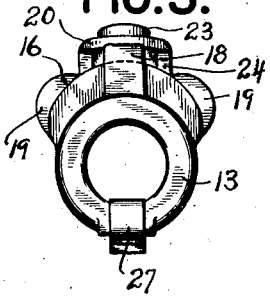
FIG.3.
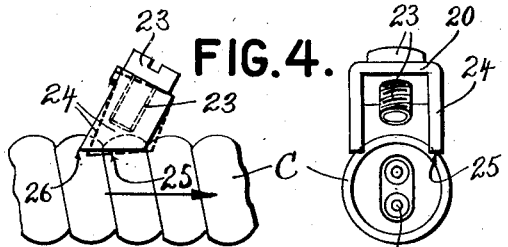
FIG.4.
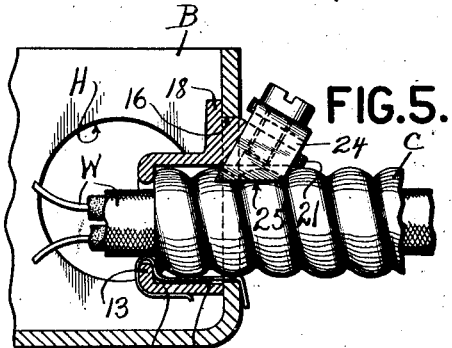
FIG.5.
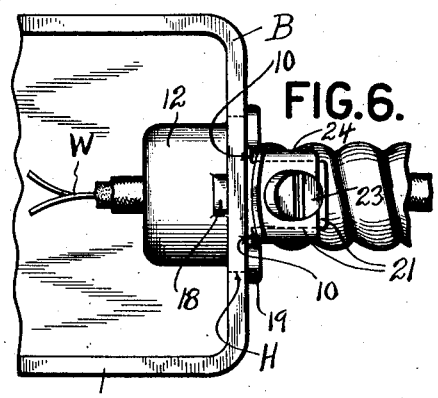
FIG.6.
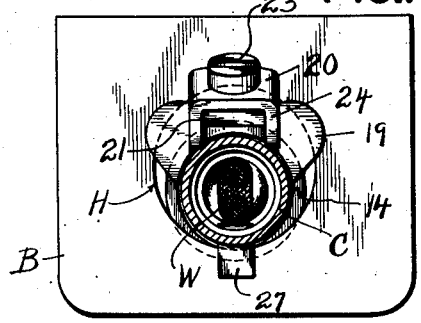
FIG.7.
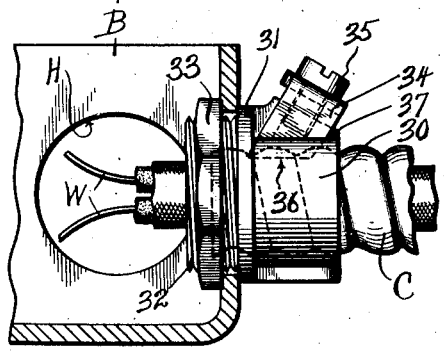
FIG.8.
FIG.9.
Inventor
GEORGE C. THOMAS JR.
By his Attorneys
Bohleber & Ledbetter Patented Jan. 20, 1931

1,789,915

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed September 15, 1928. Serial No. 306,238.

REISSUED

This invention relates to connecters for use with electrical outlet box assemblies and the like, and more particularly relates to cable connecters for securing cables to boxes used in connection with house and building electrical wiring jobs and installations.

An object of the invention is to produce a novel cable connecter simple in structure and use and which will positively secure a cable to an outlet box as well as simultaneously anchor itself to the box by actuation of a single operating means.

A particular object of the invention is to produce improvements in cable clamping means forming a part of the connecter, the clamping means being actuated by an operating means to fix the cable in the box; and in one form of the invention, the reaction force produced by the operating means simultaneously anchors the connecter in the box knock-out. In a modified form of the invention, the operating means merely functions to actuate the cable clamp since there is provided a separate and independent anchorage means to fix the connecter in the box.

Having the foregoing objects and others in view, the invention relates to improvements in construction and use as shown in the examples of the invention portrayed in the accompanying drawings, wherein:

Figure 1 shows a side elevation, Figure 2 a longitudinal section, and Figure 3 an inside end elevation of the cable connecter.

Figure 4 shows, respectively, a side and end elevation of a novel cable clamp loosely carried on screw operating means and engaging a cable. These two views are in effect diagrammatic to show the application of the two-legged, U-shaped or yoke-like cable clamp to the cable. Particularly the side view shows in dotted lines the tilted back position of the lower end of the clamp and illustrates how its pronged or barbed front end digs into the cable to more firmly grip it in event a strain or pull is exerted on the cable in the direction of the arrow tending to jerk the cable from the box or loosen the cable in the box.

Figure 5 shows a box assembly view in longitudinal section with the box, the cable connecter and the cable in finally anchored position.

Figure 6 is a plan view of the box assembly with the connecter and cable anchored in place; and Figure 7 is an outside end elevation thereof.

Figures 8 and 9 show a modified form of the invention, Figure 8 being a longitudinal section of the box assembly and Figure 9 being an outside end elevation thereof. This modified form of connecter differs from the main form only in the box-anchorage means to fix the connecter in the box, since in this modified form I employ an ordinary lock nut to anchor the connecter in the box, whereas in the first form of the invention I employ a single operating means such as a screw to perform both functions of anchoring the connecter in the box and securing the cable in the box.

In house wiring installations, a box B is anchored to the building in the usual way and a cable C containing electrical wiring is introduced through the box knock-out or hole H formed in the box. Electrical wire connections are made with the wires W in the box for supplying current to lighting fixtures, electrical appliances and the like and the present invention more particularly relates to improved connecter means for fastening the cable C to the box B.

The connecter consists of a casting or frame part made in any suitable shape such as a connecter member 12 which is here shown as a sleeve and on which the movable parts are mounted. The sleeve 12 may assume various forms of construction which is apparent from an inspection of the two examples of the invention. One type of connecter member is shown at 12 in Figures 1 through 7, while another type of connecter member is shown at 30 in Figures 8 and 9. The connecter member may be made with a bushing 13 which acts as a stop against which rests the inner end of the cable as shown in Figure 5. The other end of the connecter member is cut away at 14 thereby leaving an overhanging extended portion 15 which produces a connecter member having a short and long portion. The cut away end or face 14 of the member affords a flat abutment end or edge 14 which rests against the box wall when the connecter is installed. In this instance the connecter end portion 14 rests against the inside box wall surface.

The casting 12 includes a box hole edge seat 16 raised on the member 12 and which may to advantage be formed on a radius substantially equal to the radius of the box hole H so as to fit thereinto. The arcuate box hole edge seat 16 is eccentric to the axis of the cable C and hence is eccentric to the axis of the sleeve 12. When the connecter is in place in box hole H, the seat 16 displaces the connecter 12 off center of the axis of the box hole H. This arrangement seats the cable C against the exposed portion of the box hole edge which is left uncovered by the cut-away formation 14 of the connecter when it is mounted in the box hole.

The connecter sleeve 12 also includes box abutments or box anchorage means comprising ears 18 and 19. There are three ears shown and they are adapted to anchor the connecter in the box hole against displacement. Two of the anchorage ears, say 19, may be formed in circumferential alignment while the other ear 18 is spaced from the ears 19 a distance about equal to the thickness of the box wall B and in this way the box wall rests on the seat 16 between the ear 18 and ears 19. Hence the abutment or anchorage means 18—19 are disposed on the outside and inside of the box wall and anchor the connecter against longitudinal displacement so long as the connecter seat 16 engages the box hole edge.

The overhanging sleeve or member portion 15 carries the eccentric box hole edge seat 16 and abutment ears 18 and 19 above or opposite the cut-away end edge 14 as shown. Furthermore the elongated or overhanging portion 15 includes a screw support lip 21 in which a threaded screw hole 22 is preferably made at an angle to the axis of the connecter member 12 and the box hole H. Operating means such as a screw 23 is mounted in the threaded hole 22 and the axis of the screw is directed at an angle to the box wall B whereby the force delivered by the screw is in a direction toward the exposed box hole edge portion which is opposite the arcuate seat 16 and screw 23.

The overhanging screw-carrying lip 21 is disposed between the outside box ears 19 and preferably has parallel sides. The parallel sides of the lip 21 in effect define slots 10 between the ears 19 and the lip 21. The slots 10 are directed along a plane parallel to the axis of the screw 23 for slidable and guided reception of a clamp, and an improved cable clamp 24 is made substantially U-shaped and includes parallel clamp legs 24 and slidably straddles the lip 21. The parallel sides of the lip 21 forms a guide on which the clamp slides up and down in relation to the cable.

A free or unthreaded screw hole 17 is made in the top of the clamp for the free reception of the screw 23 which slidably retains the clamp 24 in place. The cable clamp 24 has its lower ends formed at an angle to the axis of the screw as indicated at 25 and the clamp legs are barbed or pointed at 26 on their front edges. The end edges 25 of the cable clamp are disposed in separated relation but stand parallel to the cable C so as to bear against the cable when the clamp is tightened in final fixed position. The cable clamp 24 is loose on the screw 23, the screw hole 17 being large and loose, so as to adjust itself and tilt to dig the barb points 26 into the cable should an outward pulling force be exerted thereon as illustrated in Figure 4.

The clamp 24 being placed and guided astride the screw carrying lip 21, moves up and down in guided relation in the grooves or slots 10 formed between each ear 19 and the lip 21 when the slots or grooves 10 are used. The threaded shank of the screw 23 is preferably shorter than the plate-like clamp legs 24 and this relation of the screw and the clamp prevents the screw end from engaging the cable and crushing it. In other words the edges 25 of the cable clamp first reach and grip the cable C between said edges 25 and the exposed box hole edge H and accomplishes this purpose before the screw has reached the cable. The screw is preferably just long enough to be screwed well into or substantially through the overhanging lip 21 at the time the cable clamp 24 has reached firmly seated engagement against the cable C.

The parallel flat clamp plates or legs 24 are disposed in substantially parallel planes which planes are also about parallel to the cable axis and the clamp legs are disposed at an angle to the cable axis so that the head 20 of the cable clamp is mounted outside the connecter and is engageable by the screw operating means 23 to move the clamp down into engagement with the cable. The cable is gripped by the two spaced plates 24 along parallel lines on each side of the axis of the cable. The width of the plates and hence the length of the biting or gripping edges 25 is sufficient to bridge over the convolutions of the cable and therefore a positive grip is secured on the cable. Furthermore the plates 24 are stamped out of relatively thin stock and their gripping ends 25—26 present sharp edges which burr onto the cable.

The pressure developed by the screw 23 and imparted to the cable clamp 24 very positively seats the cable C against the exposed box hole edge H and the reaction from the force produced by the screw causes the connecter seat 16 to be forced against the box hole edge with the ears 18 and 19 bearing against the inside and outside box wall surface to thereby anchor the cable connecter 12 against any longitudinal displacement. It is the disposition of the box-anchorage means 18—19 which anchors the connecter in the box at the same time the operating means 23 functions to grip the cable. The cable clamp points or barbs 26 burr, squeeze or prick into the cable especially so if there is any tendency for the cable to be pulled from the box because a jerk or force on the cable in the direction of the arrow Figure 4 tilts or levers the clamp 24 rearwardly about the screw as a pivot thereby more deeply embedding the clamp edges 25—26 into the cable. In building construction, it frequently happens that a cable is subjected to a jerking force by reason of a workman accidently stepping on or dropping material on a cable, but this connecter is found to tighten up when that happens.

Another feature to be observed is that the clamp biting edges 25—26 overlies the cutaway edge 14 and hence overlies the exposed box hole edge portion left uncovered thereby. In other words the clamp ends or edges extend thru the box hole H from outside to inside the box and this is accomplished by the angular setting of the yoke-clamp in respect to the cable axis.

It is noteworthy that the clamp edges 25—26, which are opposite the headed end 20 of the clamp, afford two spaced parallel gripping edges which bear on the cable to each side of the center thereof. In other words the two spaced gripping edges 25—26 bear on each side of the axis of the cable as distinguished from bearing directly on the top or center of the cable which is common in the art and which is more likely to crush the cable than when bearing or gripping on the sides as characteristic in this invention. By delivering the gripping force to the side of the cable very nearly tangent to the circle defining the cable, it follows that there exists less danger of crushing the cable than when delivering the force centrally thereon; and by delivering the clamping force to two sides of the cable in a tangential manner it follows that one force opposes the other and there exists no tendency to rotate the cable because the force of one gripping plate 24 opposes that of the other. These features afford advantages in the several ways explained.

The connecter is mounted in the box by a tilting action and by angularly introducing the connecter through the box hole until the inner ear 18 has been inserted, whereupon the connecter is straightened up with the abutment end edge 14 resting against the box wall surface and with the connecter seat 16 against the box hole edge. The mechanic may now hold the connecter with one hand while he introduces the cable C with the other, and thereafter tightens up the screw 23 and thus presses the clamp 24 against the cable to complete the box assembly.

The foregoing description discloses a cable connecter of a type wherein the box hole edge H is partly exposed by the connecter when placed in the box hole. This type of connecter drops out of place unless held by one's hand until the cable C is inserted. To obviate this difficulty, a connecter support spring 27 may be attached to the shorter portion of the connecter member and the spring 27 overhangs the end edge 14. Spring 27 rests against the exposed box hole edge portion and may to advantage hook around the box wall as shown in Figure 5. This arrangement holds the connecter 12 in place without the aid of the mechanic's hand. The spring 27 yields or bends upwardly so the connecter may be tilted and pressed downwardly until the ear 18 slips through the box hole, whereupon the spring 27 reacts and snaps the connecter seat 16 up against the box hole edge and holds the connecter in place thereby freeing one's hand for other work. The advantage of the spring 27 is mentioned but not claimed.

In both forms of the invention, the head 20 of the cable clamp is advantageously engaged by the head of the screw 23 which drives the parallel clamp plates 24 and their jaw plates and jaw-like edges 25 against the cable surface, and the proximate surfaces of the screw head and the clamp head 20 are parallel and evenly engage each other. Although the loose-fitting screw hole 17 allows the clamp jaw plates 24 to wobble or tilt on the screw, the flat screw head engages the clamp head 20 and straightens up the clamp plates 24 causing them to force their jaw-like edges 25 along the surface of the cable, bridging over the convolutions of the cable due to the reach or length of the jaw edges.

A modified form of the invention is shown in Figures 8 and 9 and differs in structure from that heretofore described in that the box anchorage means is altered and a nut and screw anchorage means 32—33 is here used instead of abutments 18—19 on the exposed box hole edge type of connecter heretofore described.

The modified form of connecter comprises a sleeve 30 having a shoulder 31 and a screw threaded neck 32 with a lock nut 33 which anchors the connecter 30 in the box B. In all other respects, a cable clamp 34 used on the connecter 30 is similar or the same as that heretofore described and is actuated by a screw 35 so as to drive the inner biting clamp ends 36 into the cable. The U-shaped or yoke clamp 34 straddles a lip 37 and slides in guide-ways or slots 38 formed in the sleeve at each edge of the lip 37. The clamp 34 is free and in effect tiltable on the screw 35 and any force exerted on the cable tending to dislodge it from the box causes the front barbed and pointed end of the two clamp legs 34 to dig into the cable armor and by a leverage action the barbs increase their digging-in effort and thereby positively secures the cable in the box.

What is claimed is:

1. In a cable connecter, a connecter member and means to anchor it in a box hole, a cable clamp and operating means therefore carried with the member and comprising a yoke having parallel clamp legs, the legs being formed of flat portions disposed angularly to the axis of a cable which is adapted to be secured to the box hole, and the ends of the legs gripping the cable along lines on each side of and parallel to the axis of the cable.

2. In a cable connecter, a connecter member and means to anchor it in a box hole, said connecter member being formed with spaced grooves extending parallel to the axis of the box hole, a U-shaped cable clamp slidably mounted in the grooves and being provided with an unthreaded hole for the free reception of a screw, and a screw turning freely in the unthreaded hole of the cable clamp and being screw threaded into the connecter member.

3. In a cable connecter, a connecter member and means to anchor it in a box hole, said connecter member being provided with two parallel slots therein formed in parallel relation to the longitudinal axis of the member, a flat clamp plate slidably mounted in each slot and one end of the plates being adapted to engage a cable received into the box hole, and operating means carried on the member and engaging the other ends of the flat plates to force the plates against the cable.

4. In a cable connecter, a member and means to anchor it in a box hole and being adapted to secure a cable, a screw threaded thru the member, said member being provided with cable clamp guide means adjacent the screw, a U-shaped cable clamp mounted free on the screw and slidably retained on the guide means and forced toward the cable by the screw, and the U-shaped clamp including parallel legs which are mounted at an angle to the longitudinal axis of the connecter member and engaging the cable in spaced relation on each side of the cable axis.

5. In a cable connecter, a connecter member and anchorage means to fix the same in a box hole and being adapted to secure a cable in the box, a U-shaped cable clamp which includes parallel plates joined together at one end by a head plate forming the closed end of the U-part and the other ends being free to grip a cable, the clamp being mounted slidably on the member at an angle to the cable axis and the plates being disposed parallel to the axis of the cable and adapted to engage the cable along parallel lines on each side of the cable axis; and a screw passed freely thru an unthreaded hole in the head plate and being threaded thru the member between and parallel to the plates, and the screw being shorter than the plates whereby the latter first engage the cable and the screw stands away from the cable to avoid crushing it.

6. In a cable connecter, a member and anchorage means to fix it in a box hole, a cable clamp including a plate-like device and means guiding it in movable relation at an angle to the longitudinal axis of the member, a gripping edge formed on one end of the device to engage a cable along a line parallel to the cable axis, operating means mounted on the member and engaging the device to force it against the cable, and a tiltable loose connection being established between the operating means and device whereby the gripping edge of the device tilts and levers about the loose connection to burr deeper into the cable if the latter moves in a direction away from the box.

7. In a cable connecter, a member and means to anchor the member in a box knock-out, a guide way and retaining means formed on the member to movably support a cable clamp, a cable clamp of U-shaped formation slidably mounted on the guide way and retaining means, the cable clamp being mounted at an angle to the longitudinal axis of the member, said U-shaped clamp having a head portion at one end thereof and provided with an unthreaded screw hole, a screw which is threaded into the member and which is inserted movably thru the unthreaded hole to afford a free tilting motion of the clamp on the screw, the clamp having parallel end edges at its other end which are adapted to grip a cable, and the clamp being adapted to tilt on the screw whereby the end edges of the clamp are forced deeper into the cable if the latter is pulled in a direction away from the box.

8. In a connecter, a member and means to anchor it in a box knock-out, a screw which is threaded into the member and said screw being directed at an angle so that the inner screw end points toward the edge of the box knock-out, guide way means on each side of the screw, a U-shaped cable clamp having parallel plates joined by a head and an unthreaded screw hole being formed in the head at one end of the plates, the parallel plates being slidably mounted in the guide way means and the screw being passed freely thru the unthreaded hole, the other end of the plates having angular edges adapted to bear on a cable for clamping engagement therewith and the edges being pointed at one end, and the plates being adapted to tilt in case a pulling force is exerted on the cable whereby the pointed edges grip hard against the cable.

9. In a connecter, a sleeve and anchorage means to fix it in a box hole, a lip formed on the sleeve and a slot formed in the sleeve adjacent each side of the lip, a screw which is threaded thru the lip between the slots, a cable clamp made U-shaped placed astride the lip and including parallel plates joined at one end by a head and an unthreaded hole formed in the head thru which the screw is passed to retain the clamp in the slots, and the other end of each plate forming a cable gripping edge whereby two spaced edges are afforded which bear on the cable on each side of the axis of the cable and along lines of contact which are parallel to the cable axis.

10. In a connecter, a sleeve adapted to receive a cable and means to fix the connecter in a box knock-out, a screw which is threaded thru the sleeve toward the cable but too short to reach the cable therein, a pair of spaced clamp plates joined at one end thereof by a head portion integral with the plates and an unthreaded hole in the head portion thru which the screw is loosely inserted, the clamp plates being movably confined in guide way means formed in the sleeve and the plates being parallel to the screw, and the other end of the clamp plates having spaced gripping edges which bear tangentially on each side of the cable along a line substantially parallel to the cable axis.

11. In a connecter, a member and anchorage means to fix it in a box hole, a cable clamp and guide way means being formed in the member to receive the same, said clamp consisting of a head and jaw plate means having spaced cable gripping edges, a screw which is threaded into the member and mounted thru a loose-fitting hole provided in the head between the jaw plate means of the clamp, and the head of the screw being adapted to engage the head of the clamp to force the spaced cable gripping edges into the cable.

In testimony whereof I affix my signature.

GEORGE C. THOMAS, Jr.